US012280860B2

(12) United States Patent
Ferreira Da Silva et al.

(10) Patent No.: US 12,280,860 B2
(45) Date of Patent: Apr. 22, 2025

(54) SUBSEA ROBOT AND METHOD FOR DETECTING NORM BREAKDOWN IN A PRODUCTION SYSTEM

(71) Applicant: PETROLEO BRASILEIRO S.A.—PETROBRAS, Rio de Janeiro (BR)

(72) Inventors: Mario Germino Ferreira Da Silva, Rio de Janeiro (BR); Antonio Jose Perez Rodrigues De Britto, Teresopolis (BR); Francisca Ferreira Do Rosario, Rio de Janeiro (BR); Bruno Barbosa Castro, Rio de Janeiro (BR); Rosane Alves Fontes, Rio de Janeiro (BR)

(73) Assignee: PETROLEO BRASIL S.A.—PETROBRAS, Rio de Janeiro (BR)

( * ) Notice: Subject to any disclaimer, the term of this patent is extended or adjusted under 35 U.S.C. 154(b) by 529 days.

(21) Appl. No.: 17/555,749

(22) Filed: Dec. 20, 2021

(65) Prior Publication Data

US 2022/0194535 A1 Jun. 23, 2022

(30) Foreign Application Priority Data

Dec. 22, 2020 (BR) ...................... 10 2020 026473 7

(51) Int. Cl.
*B63G 8/00* (2006.01)
*B08B 9/032* (2006.01)
*F16L 55/24* (2006.01)

(52) U.S. Cl.
CPC ............ *B63G 8/001* (2013.01); *B08B 9/0326* (2013.01); *F16L 55/24* (2013.01); *B63G 2008/005* (2013.01)

(58) Field of Classification Search
CPC .......... B63G 2008/005; F16L 2101/30; G01T 1/167; G01T 1/202
See application file for complete search history.

(56) References Cited

U.S. PATENT DOCUMENTS

| 5,686,674 A * | 11/1997 | Lowry | E21B 23/08 92/92 |
| 11,143,599 B2 * | 10/2021 | Morris | G01N 21/954 |
| 2016/0320282 A1 * | 11/2016 | Dingman | G01B 15/02 |

FOREIGN PATENT DOCUMENTS

WO WO-2017184793 A1 * 10/2017 ............. E21B 33/12

* cited by examiner

*Primary Examiner* — Andrew Polay
(74) *Attorney, Agent, or Firm* — RAPHAEL BELLUM PLLC

(57) ABSTRACT

In order to meet the objectives described above, the present invention provides a robot for detecting breakdown of NORM (Naturally Occurring Radioactive Materials) in a production system, in order to plan operations to remove scale containing radioactive material, and for decommissioning subsea system operations. The fields of application are the area of flow assurance and reservoir management, using operations to chemically remove scale containing NORM in the production system, and to improve the safety of the decommissioning processes of production systems. The invention allows the position of the scale inside the production system to be safely detected, such as, for example, the beginning of the deposit inside a production line, the extension of the deposit, and the end of the deposit, as well as whether the deposit occurred at different points along the production line.

5 Claims, 2 Drawing Sheets

| Radionuclide | Natural Gas Bq/m3 | Produced Water Bq/l | Scale Bq/kg | Debris Bq/kg |
|---|---|---|---|---|
| U-238 | | trace | 1-500 | 5-10 |
| Ra-226 | | 0.002-1,200 | $100\text{-}15\times10^6$ | 50-800,000 |
| Po-210 | 0.002-0.08 | | 20-1,500 | 4-160,000 |
| Pb-210 | 0.005-0.02 | 0.05-190 | 20-75,000 | $10\text{-}1.3\times10^6$ |
| Rn-222 | 5-200,000 | | | |
| Th-232 | | trace | 1-2 | 2-10 |
| Ra-228 | | 0.3-180 | $50\text{-}2.8\times10^6$ | 500-50,000 |
| Ra-224 | | 0.05-40 | | |

SUBSEA ROBOT AND METHOD FOR DETECTING NORM BREAKDOWN IN A PRODUCTION SYSTEM

FIELD OF THE INVENTION

The present invention is based on the development of a solution for detecting, locating, and removing scale and subsea pipelines.

DESCRIPTION OF THE STATE OF THE ART

For a long time the oil industry has been facing a problem in transporting oil through pipes: there is a periodic need to perform maintenance on pipes in order to unclog them, as they tend to be completely obstructed by scale arising from the transport process.

Scaling occurs when solid particles present in the flowing fluid begin to aggregate on pipe walls, and by agglomerating, form a layer of substrate that obstructs the pipe section. With this reduction in the pipe section there is an increase in the internal pressure of the system, as well as a reduction in the volume transported, consequently impairing the proper functioning of the system as a whole.

NORM, which is a material found in dispersed form in nature, does not present major hazards. It is a type of radioactive material with a small number of radionuclides. It is a source of radiation with levels below or equivalent to the exposure limit that an average individual can withstand. Oil and gas analyses from many different wells show that long half-life radionuclides from descendants of uranium and thorium series are not mobilized from the rock formations where they are contained. However, Ra-226, Ra-224, Ra-228 and Pb-210 are mobilized, and appear mainly in production water during oil and gas extraction. These isotopes and their radioactive descendants can then precipitate out of the solution, along with sulfate and carbonate deposits, forming scale or debris on pipes and equipment. Radon-222 is the immediate decay product of radium-226 and preferably follows the gas lines. It decays (by several rapid steps) to Pb-210, which can then aggregate as a thin film in gas-extraction line equipment.

Reported radioactivity levels vary significantly depending on the radioactivity of the oil reservoir and the salinity of the well's production water. The higher the salinity, the more likely NORM will be mobilized. Since salinity often increases with the age of a well, older wells tend to exhibit higher levels of NORM than younger wells. FIG. 1 shows a table containing the ranges of radionuclide concentrations normally found during oil and gas extraction.

The decommissioning of subsea production systems is a reality in the oil industry. A company that is preparing to perform operations needs to have equipment to clean the pipelines that will be removed from the seabed, especially if these pipelines contain NORM-type materials, in which case, appropriate techniques for transport and final disposal of these materials will be necessary, which involves protection against radioactive emissions.

Document U.S. Ser. No. 10/272,980B2 reveals a method for performing operations using an aquatic robotic system on a target section of pipe located in an underwater environment. The method includes the steps of deploying the underwater robotic vehicle in the water, and visually inspecting the underwater environment to locate the pipeline and its plurality of weld joints. Despite removing scale from subsea pipelines, the document does not reveal the capacity to remove NORM.

U.S. Pat. No. 6,474,349B1 reveals an apparatus for cleaning well pipes comprising an ultrasound source suspended in a working column adapted to run in the well, in which the ultrasound source provides sufficient ultrasonic energy to remove scale or other unwanted debris or particles from the well pipe. Despite removing scale in the pipe, the document does not do so in an automated way without the use of a robot.

Document U.S. Ser. No. 10/378,314B2 reveals a method for cleaning pipes using devices that generate shock waves inside a pipe, and concentrating shock waves in the pipe to remove accumulated material, and from the outside of a pipe by sending shock waves into the pipe from the outside to remove accumulated material. Despite the fact that it cleans pipes, as the present invention does, the document uses a completely different technique, and is unable to detect a specific type of scaling, or NORM.

Given the difficulties in the state of the art mentioned above, and for solutions to remove radioactive scale from underwater structures, there is a need to develop a technology capable of performing effectively and that is in accordance with current environmental guidelines. The state of the art mentioned above does not have the unique characteristics that will be presented in detail below.

PURPOSE OF THE INVENTION

It is a primary objective of the invention to develop automated and suitable equipment to assist in the decommissioning process of subsea production systems. The presence of Naturally Occurring Radioactive Material (NORM) [is] associated with scale comprised mainly of barium sulfate and strontium in pipelines and subsea equipment. The first part of this objective will be realized through a process of identifying the position and thickness of scale deposits inside the production lines. NORM sensors will be used for identification, by means of a search along the lines. The second part of this objective will be to break down the deposits by applying ultrasound to the line in the stretches where the scale was identified and located.

The secondary objective of this equipment will be use in the flow-guarantee area in order to continue production, using NORM sensors to identify the location of scale inside the production lines, and to clean the subsea production lines using ultrasound, thus eliminating the drop in load caused by scale inside the line and restoring the flow of oil.

BRIEF DESCRIPTION OF THE INVENTION

In order to achieve the objectives described above, the present invention provides a robot for detecting breakdown of NORM (Naturally Occurring Radioactive Materials) in a production system, in order to plan operations to remove scale containing radioactive material, and for decommissioning subsea system operations. The fields of application are the area of flow assurance, reservoir management, through chemical scale-removal operations for NORM in the production system, as well as improving the safety of the decommissioning processes of production systems.

The invention allows the position of the scale inside the production system to be safely detected, such as, for example, the beginning of the deposit inside a production line, the extension of the deposit, and the end of the deposit, as well as whether the deposit occurred at different points along the production line.

BRIEF DESCRIPTION OF THE DRAWINGS

The present invention will be described in more detail below, with reference to the attached figures which, in a schematic and non-limiting manner, show examples of its realization. The drawings are as follows.

DETAILED DESCRIPTION OF THE INVENTION

Figures 1, 2:
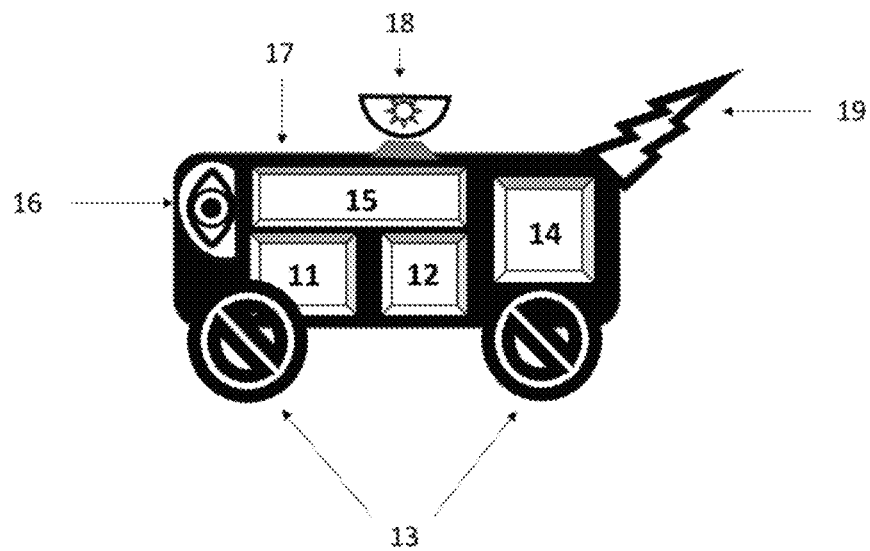
FIG. 1 shows the concentration of radionuclides in oil and gas production (IAEA, 2003).
FIG. 2 shows the ROV robot itself.

The following is a detailed description of a preferred embodiment of the present invention, which is non-limiting and by way of example. Nevertheless, from reading this description, it will be clear to one skilled in the art that there are possible additional embodiments of the present invention further comprised by the essential and optional features below. The present invention also uses the generalized description of an ROV, which may be any ROV that can walk on the production lines (flexible pipes).

The invention contributes to the planning of both scale-removal operations in active production systems, including manifold (40) and Christmas tree (50), as well as for production systems that are in the phase of decommissioning subsea systems. In both processes the position of the scale inside the production system can be safely detected, such as, for example, the beginning of the deposit inside a production line, the extension of the deposit, and the end of the deposit, as well as whether the deposit occurred at different points along the production line (30).

The ROV robot (10) has two systems, the first being a NORM-detection system (11), and the second an ultrasound-emission system (12). The first system will allow the identification and mapping of which sections along the length of the production line have scale inside, where in a decommissioning process, it can estimate the quantity and positions that have NORM deposits inside the production line (30), and thus allow planning and guidance for the procedure to remove the line from the sea floor. The second system (ultrasound emission (12)) will be used to break down the scale inside the production line (30), releasing the scale from the inner wall of the pipe as it breaks down due to the action of the ultrasound (12). From the viewpoint of the NORM-removal operation from inside the line, this information will allow better planning of the removal operation, contributing to increased efficiency for the scale removal operation, by sizing the appropriate volume of the removal solution and the positioning of this solution inside the line where the scale is located.

The measurement system will consist of a duly encapsulated NaI(Tl) scintillator detector to be used submerged at depths of up to 1500 meters. The detector consists of several structures of different materials, the sodium iodide crystal scintillator, a coating of magnesium oxide, and the aluminum housing. In order to determine the response curve of the detector, it is essential that the modeling includes all structures and materials that comprise the structure of the production line. In order for the measurement to be properly correlated with the activity of radioactive material that may be present in scale, it is necessary to determine the response curve of the scintillator detector for a defined geometry, in this case a flexible pipe, and in the modeling it is essential to consider all of the layers of the pipe and its respective dimensions and materials, as well as the internal and external fluid.

After identifying the location of the scale along the production line (30), a removal solution will be placed and positioned inside the production line (30) in the selected section, then the operation to break down the scale with the robot (10) now using the ultrasound (12) will be performed, so that when the scale on the internal walls of the line breaks down and detaches from the internal walls of the production line (30), it will be dissolved by the chelate-based removal solution, and thus may be pumped towards the SPU.

The present invention is able to remove scale from barium, calcium, and strontium sulfate polycrystals from the interior of the subsea lines using an adapted ultrasound in the robot, in which the ultrasound will be emitted through the lower part of the robot that will be over the subsea line.

The ROV robot (10) will navigate on the seabed over the line to be treated. On the lower part of the robot (10) there is a system for emitting ultrasound (12), and during navigation this part of the robot (10) will be exactly over the subsea production line (30). Therefore, when the robot (10) is navigating over the section of the production line (30) that has scale in its interior, the emission of ultrasound (12) will break down the scale on the internal walls of the line, and these lines will be filled with scale-removal solutions for the scale complexation reaction and subsequent displacement.

The ultrasound is comprised of US-generating units in the 20 kHz and 100 GHz ranges. According to the operating frequency range, its use has a certain application. The US transducers most commonly used in commercial equipment are manufactured with piezoelectric ceramics, but they can also be electromagnetic, pneumatic, and mechanical, depending on their final use.

The present invention uses low frequency (20 kHz to 100 kHz) and high intensity, capacity greater than 1 W/cm$^2$, and it is characterized by causing permanent changes in the physical, chemical, or biological characteristics of materials. The propagation of this ultrasound wave generates pressure and compression zones, shocks, acoustic distortion, cavitation in liquids, and heating of the medium where the ultrasound transducers are submerged.

The present invention consists of a conventional robot designed with the objective of operating underwater. It can adapt an array of NORM sensors and an ultrasound emission system. The robot (10) has a system that connects to the RCV boat (20), allowing remote operation of the robot (10) during its navigation over subsea equipment.

The cameras (16) can be used to observe and film the path to be traced by the robot (10), allowing its trajectory to be adjusted on the production line (30) during navigation.

The robot (10) also has an electrical propulsion system that is powered by the connection between the ROV robot and the RCV support vessel (20), so it can move over the equipment, such as the subsea line, for example. There is also a positioning and approximation system on wheels (13) that allows movement during the assessment of the presence of NORM. Another feature of the robot (10) is the adjustment of distance and angle of the wheels, allowing it to adapt to different diameters of production lines such as 4", 6", 8" and 10".

Figure 3:
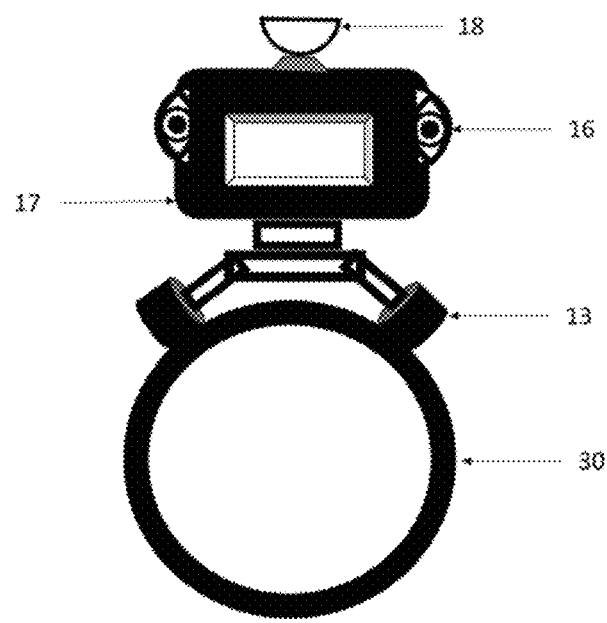
FIG. 3 shows the robot's positioning on a hydraulic line.
Figure 4:
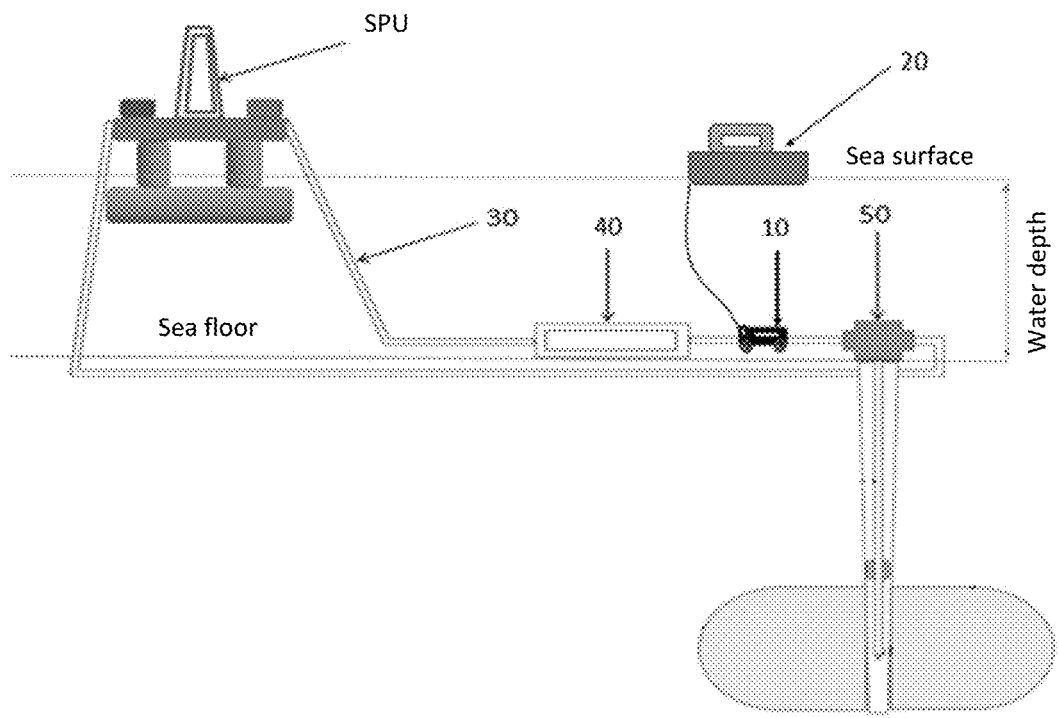
FIG. 4 shows the robot's operating environment.

Depending on the scenario, subsea production projects may have production lines with different diameters, thus the structure at the base of the robot where the wheels for movement (13) have a system that allows adjustments to be made to adapt properly to the diameter. Thus, the area between axles and between wheels is variable, and may be spaced to adjust the wheels to the diameter of the line. The angle of the wheels is the steering of the wheels as shown in FIG. 3.

The subsea robot (10) for detecting NORM breakdown in a production system is comprised of the following elements:

NORM sensors (11)
Ultrasound system (12)
Wheels for movement (13)
Propulsion system (14)
Battery (15)
Cameras (16)
Robot body (17)
Remote connection (18)
Connection with the RCV boat (19)

The process for detecting and mapping the position where the NORM is located, in addition to the removal process, is basically performed by the following steps:

a. 1$^{st}$ step: the ROV robot (10) will move over the production line (30) and at the same time it will map the scaled areas using NORM sensors (11), which may present specific results, or the results may be for a certain extension (a length of several meters);

b. 2$^{nd}$ step: the removal product (chelating agent) is pumped to the target position in the section of the production line (30) where the scale is located;

c. 3$^{rd}$ step: the ROV robot is moved with the ultrasound (12) active, to the target position of the production line, in an effort to release the scale from the interior, and completely removing the scale;

d. 4$^{th}$ step: the fluid is again pumped to displace the chelating agent with the dissolved scale to the SPU or to the support vessel (20), thus cleaning the production line (30).

After these steps, there are two possible scenarios: the first is that the process can be performed in wells that are still producing, and thus the well can be opened for tests to verify if there was an improvement (increase) in production flow after treatment; the second, in cases in which the wells are no longer producing, it would be necessary to displace the fluid to the SPU and then pass the robot over the line again to ensure that there is no longer any trace of NORM incrusted inside the line, that is, confirming if the removal was complete, otherwise, the process must be repeated starting from step 2.

The invention claimed is:

1. A Remotely Operated Vehicle (ROV) subsea robot for detecting a breakdown in production systems, the ROV subsea robot comprising:
   a propulsion system (14),
   at least one battery (15),
   a set of cameras (16),
   a body (17) that enables the insertion of various auxiliary components,
   a remote connection (18),
   a connection with the RCV vessel (19),
   a Naturally Occurring Radioactive Material (NORM)-detection system (11), and
   an ultrasound emission system (12),
   wherein the NORM-detection system (11) comprises a sodium iodide NaI crystal scintillator detector, coated with magnesium oxide, with an aluminum housing, in which the array is duly encapsulated to be used at depths deeper than 1500 meters.

2. The ROV subsea robot of claim 1, further comprising:
   a set of wheels for movement (13) with the distances between axles and between wheels being variable and adapted to enable movement over the oil production lines (30).

3. The ROV subsea robot of claim 1, further comprising:
   an ultrasound emission system (12) in which the transducer has emissions in the range of 20 kHz to 100 kHz with capacity of at least 1 W/cm2, made of piezoelectric ceramics and being located on the lower part of the robot (10).

4. The ROV subsea robot of claim 2, wherein the wheels for movement (13) are adjustable for diameters ranging from 4 inches to 12 inches.

5. A method for detecting breakdown in production systems according to the equipment of claim 1, wherein the method comprises:
   moving, by the ROV robot (10), over the production line (30),
   mapping the locations of the scale using NORM sensors (11) at the same time the ROV robot (10) is moving;
   pumping the removal product (chelating agent) to the target position on the section of the production line (30) where the scale is located;
   moving the ROV robot (10) with the ultrasound (12) active, to the target position on the production line, in order to release the scale from inside the line; and
   pumping the fluid is to move the chelating agent with the dissolved scale to the SPU or to the support vessel (20), thus cleaning the production line (30).

* * * * *